May 11, 1954 — F. GRAF — 2,677,997
REFLEX CAMERA
Filed Nov. 7, 1950 — 2 Sheets-Sheet 1
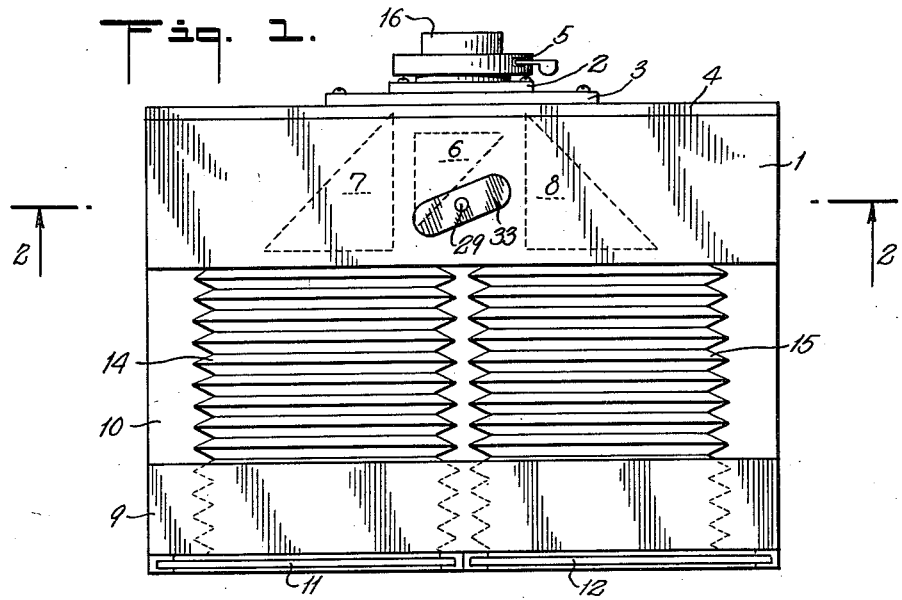
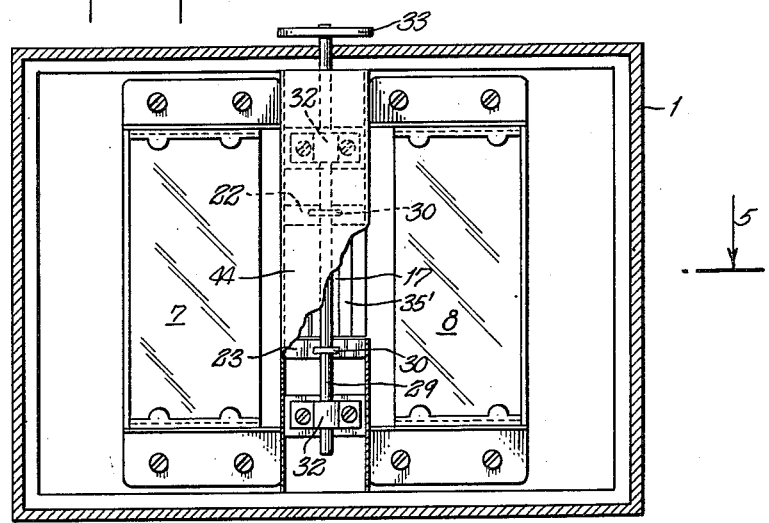
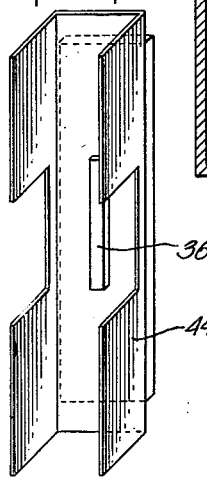
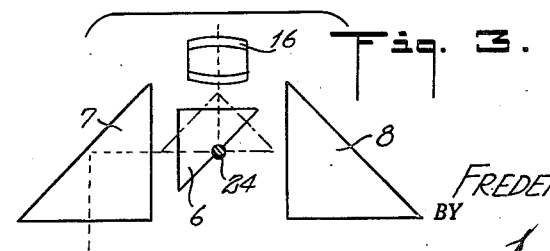
INVENTOR.
FREDERICK GRAF
BY
ATTORNEY

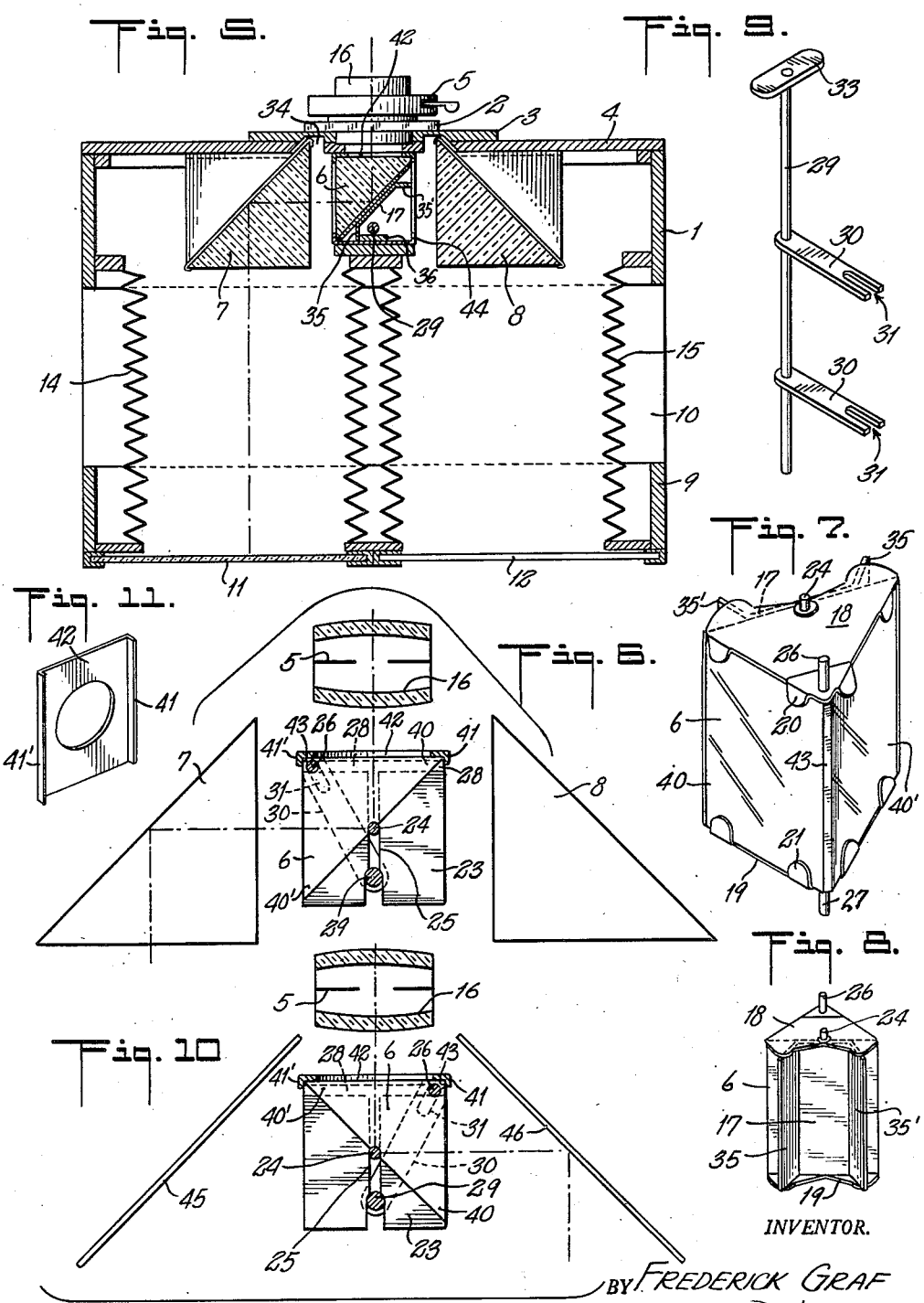

Patented May 11, 1954

2,677,997

UNITED STATES PATENT OFFICE 2,677,997

REFLEX CAMERA

Frederick Graf, Flushing, N. Y.

Application November 7, 1950, Serial No. 194,516

2 Claims. (Cl. 95—42)

My invention relates to photographic cameras of the single lens reflex type.

One object of the invention is to provide a camera wherein the image may be projected at will either to a screen or ground glass for focusing, or to a sensitized surface for "taking."

Another object is to provide a camera in which the image seen on the ground glass is exactly the same as that projected on the plate or film since the same lens is used for both.

Another object is to provide a camera in which prisms may be used instead of metal or glass mirrors.

Another object is to utilize the smallest possible prisms commensurate with highest effectiveness to cut down on size, weight and cost.

Another object is to do away with the problem of parallax as found in some twin-reflex cameras.

As constructed according to my invention, the camera will include a single lens and a ground glass for focusing and a plate or film holder side by side at the rear of the camera, two fixed reflectors such as prisms or mirrors, and a smaller rotatable right-angled prism between the reflectors, all mounted in such a manner that the image from the lens will be reflected to either of the fixed reflectors at will, the reflective prisms in turn reflecting the image to either the ground glass or the sensitive film or plate according to which one receives the image.

Fig. 1 is a plan view of one form of camera involving my invention.

Fig. 2 is a vertical sectional view taken on the plane of the line 2—2 of Fig. 1, parts being broken away.

Fig. 3 is a diagrammatic plan view of one arrangement of lens and prisms.

Fig. 4 is a perspective view of a partition or housing, for the movable prism.

Fig. 5 is a horizontal sectional view taken on the plane of the line 5—5 of Fig. 2 showing the movable prism in position to reflect to the left.

Fig. 6 is a part plan and part diagrammatic view of the lens and prisms of Fig. 1 showing the movable prism in position to reflect to the left.

Fig. 7 is a perspective view of the front of the movable prism and holder of Fig. 5.

Fig. 8 is a perspective view of the rear of the prism and holder.

Fig. 9 is a perspective view of the operating shaft.

Fig. 10 is a part plan and part diagrammatic view showing the movable prism in position to reflect to the right and showing side mirrors instead of prisms.

Fig. 11 is a perspective view of the front plate.

The drawings show the invention as applied to a box type camera in which the front of the frame 1 supports the lens and prism constructions. The lens holder 2 is carried by a plate 3 detachably connected to a front plate 4. Any suitable form of shutter mechanism 5 may be employed. In this instance, it is a front operated type. The central prism 6 is mounted between the two lateral prisms 7 and 8.

The rear frame 9 is mounted to slide on a base plate 10 in a conventional manner. At the rear, the frame 9 carries a ground glass finder screen at 11 and a suitable form of sensitive plate or film holder at 12. Bellows 14 and 15 are provided in a conventional manner. The lens 16 may be of any suitable type and supported in any suitable manner.

The prism 6 is shown in detail in Fig. 7 as carried by a frame including a face plate 17 secured to the broadest side or face of the prism and top and bottom plates 18 and 19, respectively. The top and bottom plates are secured to the prism by lugs 20 and 21, respectively. The prism carrying frame is supported between fixed plates 22 and 23. A pair of pivot pins or shafts 24 are located on a common axis and project outwardly from the top and bottom plates 18 and 19, adjacent the plate 17 and move through axial slots 25, 25 in the supporting plates 22 and 23 for guiding the movement of the prism. Opposite the pins 24 on the top and bottom plates are pivot pins 26 and 27, respectively, which project into substantially straight transverse slots 28, 28 in the supporting plates 22 and 23 for guiding the movement of the prism. Pins 26, 27 are arranged on a common axis which is parallel to the axis of pins 24.

The reflecting prism 7 is mounted at the left of the central prism 6 as viewed in Figs. 1 and 5, in any suitable manner and reflects the image to the finder screen 11 when the central prism is in the position shown in dotted lines in Fig. 1 and in the position shown in full lines in Fig. 6. The prism 8 mounted at the right serves to reflect the image to the sensitive film or plate at 12, when the central prism is in the position shown in Fig. 10.

To turn the prism 6 from side to side or from the position of Fig. 1 to the position of Fig. 10, I provide a shaft 29 which is supported in the top and bottom plates of the prism holder and has extension arms 30, 30 which are slotted at their outer ends as indicated at 31, 31 to engage the pivots 26, 27. The shaft 29 is supported in bearings 32 and is provided with a knob or handle 33.

The pins 26 and 27 slide transversely in the slots 28, 28 while the pins 24 and 24 slide longitudinally in the slots 25, 25.

It will be noted that the reflecting surfaces of the prisms 7 and 8 extend forwardly into the grooves 34 beyond the prisms and rearwardly beyond the rear edge of the prism 6 so as to be sure and receive all of the available image.

I also provide barrier flanges 35 and 35' on plate 17 which abut against the stop 36 as the prism 6 is turned from side to side to limit its movement.

When the parts are in the position of Fig. 5, the flange 35 engages the stop 36 and at the same time the corner edge 40 of the prism carrier engages the flange 41 on the front plate 42. Simultaneously the corner edge 43 of the prism engages the other flange 41' of the plate 42.

By turning the prism 6 and its carrier 90° clockwise, the flange 35' engages the stop 36 and at the same time the edge 40' of the prism carrier engages the flange 41' on the plate 42. Simultaneously, the corner edge 43 of the prism engages the other flange 41 on the plate 42.

The stop member 36 is carried by a housing 44 which encloses the bearings and supports for the central prism 6 and its operating shaft.

The walls of the housing 44 (Fig. 4) separate the two chambers containing the reflectors 7 and 8 and prevent light from leaking from one chamber to another. The same housing separates the chambers containing the reflectors of Fig. 10.

While I prefer to employ prisms such as 7 and 8, it should be understood that suitable mirrors such as 45 and 46 may be provided instead, as shown in Fig. 10.

The mechanism for operating the prism 6 herein described provides a most compact and satisfactory action in that it is possible to locate the prism 6 close to the lens.

Fig. 3 shows a simplified form of construction in which the prism turns on a fixed axis. It will be seen however that this construction requires more space between the prism and lens than the construction shown in Figs. 5 and 6.

I claim:

1. In a view camera of the type having a single lens, separate side by side chambers, a viewing screen at the rear of one chamber, means at the rear of the second chamber for supporting a sensitive film in a common plane with said viewing screen, reflective means at the front of each chamber for reflecting an image to the rear of the chamber and a pivoted prism for directing the image from the lens selectively to one or the other of said first mentioned reflective means, the improvement comprising a pair of spaced parallel top and bottom bearing plates mounting said prism in close proximity behind said lens, said prism further being right isosceles triangular in top plan view and presenting its alternative equal sides to said lens for transferring the image, each of said plates being formed with a straight transverse slot parallel to its forward boundary adjacent the lens and perpendicular to the axis of the lens, each of said plates being formed with a longitudinal slot parallel to the axis of the lens, said prism further having firmly connected thereto a pair of top and bottom pins located on a common axis adjacent the right angle of the prism and engaged in said transverse slots of said plates, said prism further having firmly connected thereto a second pair of top and bottom pins located on a common axis substantially in the plane of the hypotenuse of said prism and bisecting the right angle thereof, said second pair of pins engaging said longitudinal slots, and an actuating shaft mounted in the camera housing within the plan outline of said plates and perpendicular thereto, said shaft having two arms firmly connected thereto and extending radially therefrom, said arms being formed at their outer ends with elongated slots and said first mentioned pair of pins further being engaged in said slots of said arms, whereby rotation of said shaft causes said right angle of said prism to sweep across the rear of said lens in close proximity thereto to transfer the image from screen to film and vice versa, said second pair of pins receding from the lens along said longitudinal slots as said first pair of pins approaches the center of said transverse slot and returning to position as said first pins proceed from center to the end of said transverse slot.

2. In a view camera of the type having a single lens, separate side by side chambers, a viewing screen at the rear of one chamber, means at the rear of the second chamber for supporting a sensitive film in a common plane with said viewing screen, reflective means at the front of each chamber for reflecting an image to the rear of the chamber and a pivoted prism for directing the image from the lens selectively to one or the other of said first mentioned reflective means, the improvement comprising a pair of spaced parallel top and bottom bearing plates mounting said prism in close proximity behind said lens, said prism further being right isosceles triangular in top plan view and presenting its alternative equal sides to said lens for transferring the image, each of said plates being formed with a straight transverse slot parallel to its forward boundary adjacent the lens and perpendicular to the axis of the lens, each of said plates further being formed with a longitudinal slot parallel to the axis of the lens, said prism further having firmly connected thereto a pair of top and bottom pins located on a common axis adjacent the right angle of the prism and engaged in said transverse slots of said plates, said prism further having firmly connected thereto a second pair of top and bottom pins located on a common axis substantially in the plane of the hypotenuse of said prism and bisecting the right angle thereof, said second pair of pins engaging said longitudinal slots, and pivoted operating means engaging said first mentioned pair of pins whereby rotation of said means causes said right angle of said prism to sweep across the rear of said lens in close proximity thereto to transfer the image from screen to film and vice versa, said second pair of pins receding from the lens along said longitudinal slots as said first pair of pins approaches the center of said transverse slot and returning to position as said first pins proceed from center to the end of said transverse slot.

References Cited in the file of this patent

UNITED STATES PATENTS

| Number | Name | Date |
| --- | --- | --- |
| 1,316,438 | French | Sept. 16, 1919 |
| 2,529,757 | Baer | Nov. 14, 1950 |

FOREIGN PATENTS

| Number | Country | Date |
| --- | --- | --- |
| 1,719 | Great Britain | of 1914 |
| 258,324 | Switzerland | May 2, 1949 |